United States Patent
Case et al.

[11] Patent Number: 5,897,611
[45] Date of Patent: *Apr. 27, 1999

[54] HIGH PRECISION SEMICONDUCTOR COMPONENT ALIGNMENT SYSTEMS

[75] Inventors: Steven K. Case, St. Louis Park; Jeffrey A. Jalkio; Carl E. Haugan, both of St. Paul; Eric Rudd, Hopkins; Bruce Peterson, Plymouth, all of Minn.

[73] Assignee: CyberOptics Corporation, Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/711,380

[22] Filed: Sep. 6, 1996

Related U.S. Application Data

[63] Continuation of application No. 08/289,279, Aug. 11, 1994, abandoned.

[51] Int. Cl.⁶ .................................................. G01B 11/00
[52] U.S. Cl. ...................... 702/150; 356/375; 356/400; 382/151
[58] Field of Search .............................. 364/559; 382/141, 382/151; 356/375, 376, 385, 399, 400, 401; 250/208.1, 559.29, 559.3; 29/740, 741, 833, 834; 702/150

[56] References Cited

U.S. PATENT DOCUMENTS

| | | | |
|---|---|---|---|
| 3,636,635 | 1/1972 | Lemelson | 33/549 |
| 3,854,052 | 12/1974 | Asar et al. | 250/559.2 |
| 3,905,705 | 9/1975 | Petrohilos | 356/387 |
| 4,074,938 | 2/1978 | Taylor | 356/386 |
| 4,553,843 | 11/1985 | Langley et al. | 356/375 |
| 4,585,350 | 4/1986 | Pryor | 356/375 |
| 4,615,093 | 10/1986 | Tews et al. | 29/407.04 |
| 4,741,621 | 5/1988 | Taft et al. | 356/376 |
| 4,812,666 | 3/1989 | Wistrand | 250/559.36 |
| 5,005,978 | 4/1991 | Skunes et al. | 356/385 |
| 5,039,210 | 8/1991 | Welstead et al. | 359/36 |
| 5,046,851 | 9/1991 | Morgan | 356/375 |
| 5,114,229 | 5/1992 | Hideshima | 356/237 |
| 5,114,230 | 5/1992 | Pryor | 356/372 |
| 5,162,866 | 11/1992 | Tomiya et al. | 356/237 |
| 5,260,791 | 11/1993 | Lubin | 358/160 |
| 5,278,634 | 1/1994 | Skunes et al. | 356/400 |

(List continued on next page.)

FOREIGN PATENT DOCUMENTS

| | | |
|---|---|---|
| 0 582 086 | 2/1994 | European Pat. Off. |
| 2303751 | 12/1990 | Japan. |
| 6249629 | 9/1994 | Japan. |
| 1370456 | 1/1988 | U.S.S.R. |
| 2 183 820 | 6/1987 | United Kingdom. |

*Primary Examiner*—Eric W. Stamber
*Attorney, Agent, or Firm*—Patterson & Keough, P.A.

[57] ABSTRACT

High speed high precision alignment sensor systems for use on surface mount component placement machines. Light systems are used to correctly align and position component parts. The sensor system consists of a light source and an optical lens system causing more of the light from a light source to pass the component in order to obtain a sharper component image on a sensor array. Due to the optical lens systems disclosed, either low powered lasers, light emitting diodes, or other suitable light sources can be used in the system since optical efficiency is substantially increased over prior systems since more of the radiated light is collected from the light source for measurement at the detector. The sensor system is mounted directly on the carrying mechanism for the surface mount component placement machine. During transit of the component between the bin of components and the circuit board upon which the component is to be placed, the component is rotated and the sharp shadow which falls on the detector array is monitored. Several processing algorithms are disclosed for determining correct component angular orientation and coordinate (X,Y) location of the component on the quill. Thereafter, the sensor sends correcting signals to the component placement machine.

53 Claims, 11 Drawing Sheets

U.S. PATENT DOCUMENTS

| | | | |
|---|---|---|---|
| 5,309,223 | 5/1994 | Konicek et al. | 356/375 |
| 5,331,406 | 7/1994 | Fishbaine et al. | 356/375 |
| 5,377,405 | 1/1995 | Sakurai et al. | 29/833 |
| 5,384,956 | 1/1995 | Sakurai et al. | 29/834 |
| 5,467,186 | 11/1995 | Indo et al. | 356/375 |
| 5,493,391 | 2/1996 | Neal et al. | 250/208.1 |
| 5,493,403 | 2/1996 | Nishi | 356/401 |
| 5,559,727 | 9/1996 | Deley et al. | 364/559 |
| 5,570,993 | 11/1996 | Onodera et al. | 356/375 |
| 5,660,519 | 8/1997 | Ohta et al. | 414/783 |

HIGH PRECISION SEMICONDUCTOR COMPONENT ALIGNMENT SYSTEMS

This is a Continuation of application Ser. No. 08/289,279 filed Aug. 11, 1994, now abandoned.

BACKGROUND OF THE INVENTION

The invention relates to control systems which precisely align electrical components, both as to angular orientation and coordinate (X,Y) location for precise placement via pick-and-place systems such as surface mount component placement machines. More specifically, the invention relates to optically efficient non-contact sensor systems which precisely determine and allow a pick-and-place system to correct the angular orientation of a component and the coordinate positioning of the component for precise placement of the component by a component placement machine on a circuit board or other work surface.

In component placement machines in common use today one or more vacuum quills are used to travel to a bin, pick up a component, properly orient the component and carry the component to a circuit board or other work piece. The component is precisely placed in its proper location with the leads making proper contact with the circuit connections, which are subscribed on the circuit board or work piece. Each electrical component must be placed precisely on the circuit board to ensure proper electrical contact, which requires correct angular orientation and lateral positioning. Angular orientation and lateral positioning may be achieved through mechanical means. A vacuum quill picks up the part to be placed. Four jaws or hammers, suspended from the fixturing device, may travel laterally and strike the component on all four sides with substantially equal force. The intent of such a mechanical system is to shift the component on the vacuum quill so that its angular orientation is correct and so that it is centered on the vacuum quill. The striking of such components can cause damage to the component, such as microcracking of materials commonly used in such components. It is also difficult to achieve the high degree of accuracy, both as to angular orientation and lateral position, that is required by design rules in use in today's technology.

A number of light-based, non-contact methods have been proposed. However, the light-based systems of the past have had difficulty in efficiently achieving both efficiency and the high speed and accuracy required for today's technology. Light sensing systems have also been proposed where a component is interposed in a beam of light and the intensity of the light is detected by a single photodetector or a pair of photodetectors, with a measurement of the maximum light intensity indicating the narrowest shadow, and thus, proper angular orientation of the component. However, it is difficult for such systems to handle the range of components that are placed and to achieve the accuracy required for alignment.

The dimensions of components to be placed today normally vary between components no larger than a grain of sand to component parts in the range of one to two inches. If a single photodetector system is designed large enough to detect shadow variations for a large part, as it must be, the fractional variation caused by rotation of the smallest parts (approximately 0.02 inches) have such little effect on the total light intensity that it is virtually undetectable. For two detector systems, the component part must be precisely aligned between the two detectors with the ratio of light falling on each detector being analyzed to determine edge positions. However, it is extremely difficult to mechanically align photodetectors to make such a measurement.

Finally, it has also been proposed that a series of laser light sources be aligned with a series of laser light detectors. Such a design overcomes some of the problems associated with the proposals for a single detector or pair of detectors. However, calibration of such a system would be difficult and the degree of accuracy that can be achieved can be no more than the spacing of the individual laser sources one from the other. The minimum spacing would be given by the size of a laser diode source, which still would be too large for reliable component position detection. The required physical spacing will also be negatively affected by diffraction effects to further limit the accuracy of such a design. Also, it is believed that the cost of such a system involving many laser sources would also be prohibitively expensive.

Vision based systems using a TV camera are capable of achieving high accuracy. However, they are one of the most expensive of systems proposed and they require a deviation in the path of the quill from the bin to the TV station, and then to the work piece or circuit board, which substantially slows the process. In addition, it is sometimes difficult to distinguish the particular parameters of very small components being placed by such systems from the quill upon which the components are mounted.

A laser sensor system has also been proposed which includes a laser diode, the light from which is collimated with a collimating lens and passed through a slit aperture. This provides a stripe of laser light which passes by and is blocked by the component whose alignment is being sensed. The shadow cast by the component is detected by a linear array detector. Data read from the detector array is analyzed to detect the leading edge and the trailing edge of the shadow which is cast upon the detector array. Since only the shadow edges are detected and analyzed, the same degree of accuracy is achieved when aligning a 0.02 inch part as is achieved when aligning a 2.0 inch part. However, this highly accurate system utilizes only a small portion of the laser energy generated and is sensitive to optical defects, most particularly in those small portions of the lens through which light is passed to the sensor array. Therefore, what is needed is a sensor system which captures substantially more of the emitted energy for the purposes of differentiating between shadow and light. What is needed is a sensor system for creating sharper component shadow images on the detector using any of several different light sources including low powered laser and LED light sources.

SUMMARY OF THE INVENTION

The highest degree of accuracy in the past has been achieved with laser-based systems. The precision of a laser beam, a natural point source of light, has been used for precisely measuring and aligning components. It is with a slit aperture that a precise band or stripe of light is created to pass beyond the component to be detected by the sensor array. When using a laser in the past, however, most of the emitted energy was absorbed by the carrier for the apertured slit or was reflected away from the component and the sensor array by the carrier. Although highly accurate, this was not the most efficient system.

The present invention shows how a laser can be used with collimating lenses, condenser lenses, cylinder lenses, imaging lenses, and telecentric lens systems, in a manner in which more of the light from the light source is passed beyond the component and collected for measurement and a sharper component image on the detector is obtained. Using these optical expedients, the power requirements on a laser can be substantially reduced by a factor of over one-hundred times over current systems. At this reduced power level, the laser operates as a point source of non-coherent light and the high accuracy of laser measurements is maintained at substantially lower power and stress levels.

A broad source light emitting diode (LED) has also been considered in the past for measurements of component alignment. However, the large area of light projected from most LED light sources has caused too "fuzzy" a shadow to provide a comparable sensor to one which is energized with laser light. However, if an aperture or a negative lens on the source side is used, or for some applications a very small LED, the LED can be made to appear as a point source of light energy to the sensor optics. The point source, even as a lower powered LED, achieves the high degree of accuracy that is needed. Alternatively, an imaging lens can be utilized on the receive side to image the shadow directly on the detector, thereby giving sufficient sharpness of image to make the highly accurate measurements needed.

Finally, with any suitable light source, telecentric optics can be used with field of view and depth of focus so that the image of the shadow of the component can be measured and a proper alignment achieved. Field of view is important for allowing even the largest component to be fully viewed and depth of focus is important so that any component, regardless of size, can be sharply in focus. The advantage of the telecentric lens operation is that for a wide range of component size, or for many different distances between the component to the lens/sensor configuration, the component image is still sharply focused at the detector and viewed with constant magnification. These alternative light sources, possibly with optical modification, can be utilized to achieve a highly efficient sensor system which in essence captures substantially more of the emitted energy for the purposes of differentiating between shadow and light.

It is an object of the invention to accurately and precisely determine angular orientation and lateral position of components for placement by a component placement machine.

It is an object of the invention to substantially increase optical efficiency by collecting more of the radiated light from the light source for measurement at the detector.

It is an object of the invention to accurately determine angular orientation of a component to be placed by a component placement machine with a high degree of accuracy.

It is an object of the invention to substantially decrease detection sensitivity to optical defects, including scratches and lens imperfections.

It is an object of the invention to accurately determine angular orientation and lateral placement of a component using several different light sources.

It is an object of the invention to accurately determine angular orientation and lateral placement of a component to be placed by a component placement machine in less than 500 milliseconds.

It is an object of the invention to accurately determine the angular orientation and lateral position of a component using the detected shadow of one or more lead edges.

It is an object of the invention to focus a clearer and sharper image of the component on the sensor than that possible by simply shadow casting.

It is an object of the invention to accurately determine angular orientation and lateral position for a range of components having substantial variations in size.

These and other objects, features and advantages of the invention will become obvious to those skilled in the art upon a review of the following description of the preferred embodiment, the drawings and claims appended hereto.

DESCRIPTION OF THE DRAWINGS

FIG. 4 shows the broad shadow that is cast from corner to corner of the component part. Illustrated above the linear array of FIG. 4 is representative data from the linear array.

As shown in FIG. 19, a discriminator is used to determine when the data falls below a threshold voltage. The discriminator converts the analog data to a digital representation which can then be used to establish angular orientation and edge positions of the component. Illustrated in FIG. 19 are the data points which are identified with the leading edge and trailing edge of the component shadow. Either or both detected component shadow edges can be processed for determining alignment. Also illustrated in FIG. 19 are the edges of the lead shadow which can be discriminated and converted to a digital representation of the lead alignment.

DESCRIPTION OF THE PREFERRED EMBODIMENT

Figure 1:
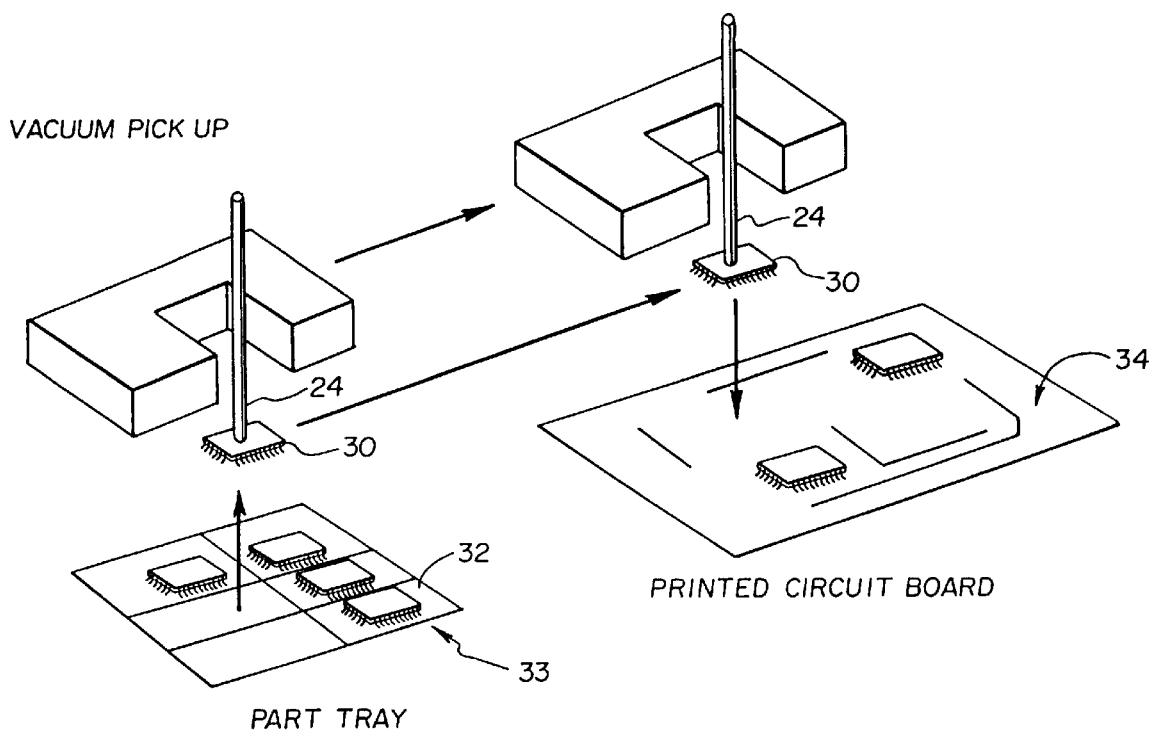
FIG. 1 is a view showing the environment of the invention. Shown in FIG. 1 is a component part tray which contains components which are placed by the component placement machine on a printed circuit board or work piece. Also shown in FIG. 1 is a component being carried in the shortest route possible by a quill surrounded by an optical sensor.
Figure 2:
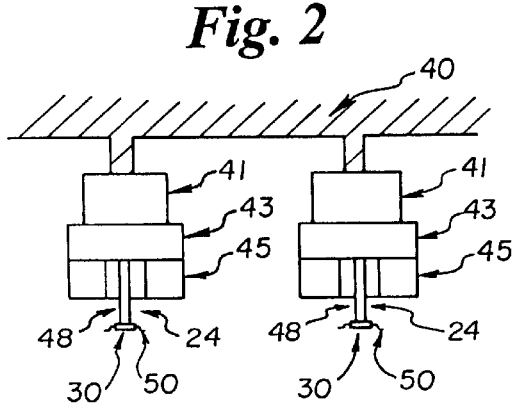
FIG. 2 is an elevational view showing in greater detail the component carrying mechanism which includes a rotary motor for rotating the component, a placement head control box and an optical alignment sensor. Extending through the alignment sensor is the vacuum quill which holds the component.

FIGS. 1 and 2 illustrate the general environment in which the invention is to be used. FIG. 1 illustrates in diagram form a typical surface mount component placement machine in which one or more vacuum quills 24, which are hollow tubes, are used to sequentially pick up components 30 from predetermined bins 32 in a part tray 33, transport them as quickly as possible to a circuit board 34 or other surface upon which the component 30 must be precisely aligned, and place the component 30 accurately at the desired location with the proper alignment of the leads 50 of the component 30 to a wiring layout which has been previously created on the circuit board 34. For high precision placement, an accuracy in angular alignment or orientation of 0.030 degrees with positioning error in the X,Y plane of 0.001 inch is desired. Component 30 part sizes typically employed in such a system vary between approximately 20 thousands of an inch in size to two inches in size, although in certain cases larger component 30 sizes are required.

Angular orientation is important because of the effect misorientation has on placement of the electrical leads. For the largest component size (e.g., 2 inches) a deviation of 0.10 degrees causes the lead positions at the outer edge of the component to be canted or misplaced by approximately 0.002 inches. It is for this reason that alignment accuracy of 0.03° is an object of the invention.

Referring to FIG. 2, the component carrier mechanism 40 is disclosed which includes a rotary motor 41, and placement head control box 43 including a fixturing device for holding, rotating and retracting the vacuum quill 24. The rotating fixture rotates the quill 24 for purposes of component 30 pickup, alignment, positioning and placement. Also represented in FIG. 2 are the sensors 45 and components 30, the proper placement of which is the subject of this invention.

In the component control box 43, which is of conventional design, are means for retracting the quill 24 to which the component 30 is attached by vacuum pressure, comprising motors, a means to create the vacuum to hold the component to the end of the quill 24, angular position encoders, force sensors and the like. Attached to the control box 43 is the laser or light based alignment sensor 45 which has an aperture 48 therein through which the quill 24 extends and into which the component 30 can be retracted for determination of its angular orientation and for alignment with the center of the quill 24.

Figure 3:
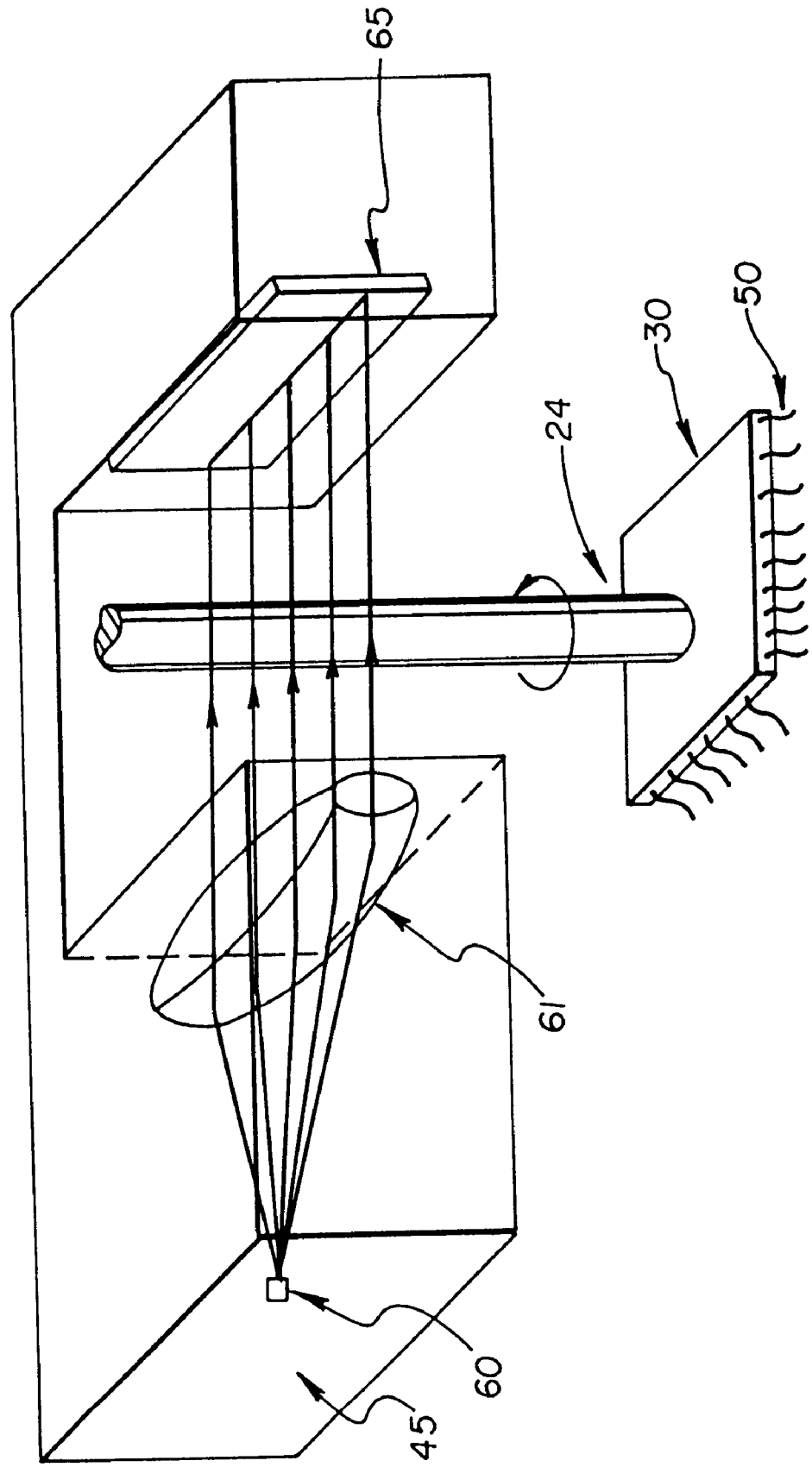
FIG. 3 is an illustration of the basic elements of the invention which include a light source, a lens which causes the light beam or stripe to pass across the component to strike a linear array image sensor and processing element for determining position of the component. During alignment, the component part is retracted into the light source and rotated for measurement.

FIG. 3 is a schematic representation of the components of the sensor 45. For ease of discussion, a line of sight representation is shown from the light source 60 through a lens 61 passed the quill 24 which carries the component 30 to the linear array image sensor 65. In actual practice, a longer focal length is desired which can be achieved with reflecting mirrors and a collimating lens or a single parabolic lens (not shown).

U.S. Pat. No. 5,278,634, which is incorporated herein by reference, discloses a highly accurate laser sensor. In the system of that patent, a laser diode operates as a point source of light which is collimated with a collimating lens to provide parallel light with a slit aperture then interposed between the collimating lens and the component whose shadow is to be measured. This provides a stripe of light which extends beyond both ends of the component and a shadow is cast on the linear array while rotating the component. The shadow itself, or preferably the edges of the shadow, can then be determined and ascertained with a high degree of accuracy so that the component can be properly centered and aligned for purposes of placement. As is known to those skilled in the art, a large amount of the light energy is blocked by the slit aperture mechanism. As more fully described below, however, a substantially greater amount of light energy can be efficiently utilized with the optical systems described below for sensing alignment.

Figure 4:
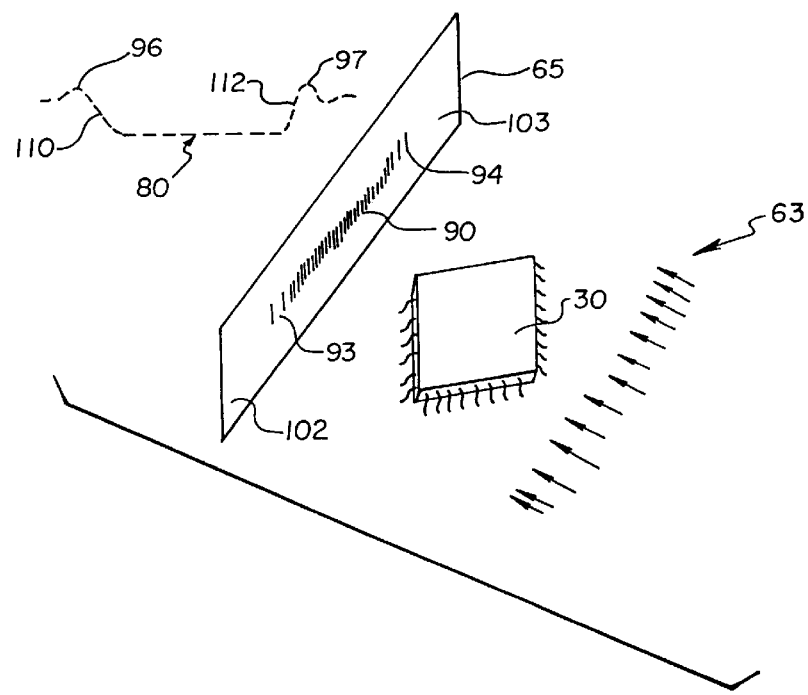
FIG. 4 is an illustration of the light paths when the component part is misoriented with the light distributed across the measurement area to focus light on and passed the component part to strike the detector array.

Referring now to FIG. 4, the detection of a shadow 90 is shown without the light source 60 or intervening optics. Light 63 is projected, in a line across the component 30 in most embodiments and toward the component 30 in another, so that a light pattern is created completely across all portions of the component 30. The light which is not blocked by the component 30 passes the component 30 and strikes a linear CCD detector array 65, such as part no. TC104 manufactured by Texas Instruments Corporation which has 3,456 elements, each 10.4 micrometers by 10.4 micrometers configured along a line with center to center spacing of 10.4 micrometer. The light pattern cast by the component 30 is detected by the multi-element sensor array 65. Preferably interposed between the component 30 and the detector array 65 is an optical filter (not shown) which minimizes ambient light and any other light which is outside of the wavelengths of interest. The data 80 thus captured from the detector array 65 is then processed using one or more of the algorithms which are discussed in more detail below.

The use of 3,456 detector array elements enables large parts to be measured. The elements are spaced at approximately 0.4 mil centers which enables high accuracy. Sensitivity to minute changes in angular orientation and lateral position is increased dramatically over prior art devices. This is because, for a given photodetector element near the shadow edge, the fractional change in light level can be very large for very small angular rotations.

In FIG. 4, the component 30 is shown with its angular orientation out of alignment. As shown in FIG. 4, a relatively large number of detector elements are blocked from the laser because of the angular misorientation of the component 30 creating a shadow 90. In addition, there are small areas of lesser shadow 93, 94 striking the array 65 created between the bright portion and the dark portion 90 caused by diffraction of the light past the edges of the component 30. In addition, minutely brighter portions 96, 97 will be detected adjacent to outer edges of the shadow 90 due to diffraction and reflection of light off the outermost edges of the component 30. Also illustrated in FIG. 4 is the data pattern 80 of the data which is read from the CCD array 65 showing portions 102, 103 of the detector array 65 which receives unblocked light from the laser source 60, and then an increase in light from reflection and diffraction 96, 97, a decreasing amount of light 110, 112 in the edge of the shadow area 93, 94 caused by diffraction, and the dark shadow area 90 with identical patterns on complimentary sides of the detector array 65.

Figure 5:
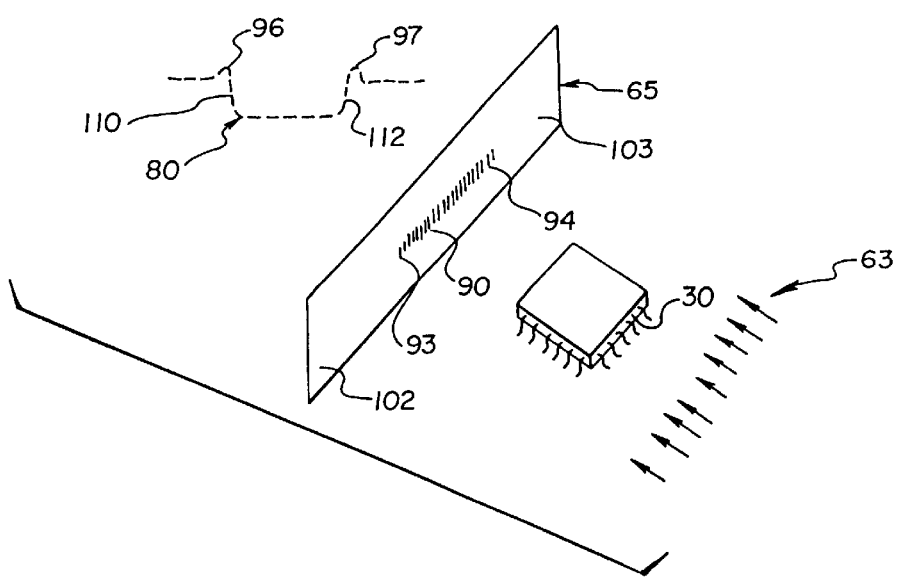
FIG. 5 shows the same components and elements of FIG. 4 when the component is in alignment. The width of the shadow or dark portion which is cast upon the linear array is narrower than that in FIG. 4. The corresponding data from the CCD array shows the narrowing of the shadow as well.

FIG. 5 illustrates the light pattern and the data 80 when the component 30 is in angular alignment. As will be obvious from a comparison of FIGS. 4 and 5, angular alignment can be assured by determining when the shadow pattern 90 is narrowest as determined by the data 80 from the sensor array 65. This can be achieved with a minimum of electronic processing means by following and determining either or both the leading edge of the shadow 110 and the trailing edge of the shadow 112 and by capturing only data 80 which precedes and follows the edges 110, 112 of the shadow and actually processing the data 80 for the edges 110, 112 to determine when the shadow 90 is narrowest or in alignment. The component can also be aligned based on the positions of the leads by capturing data corresponding to one or more of the lead shadow edges 170, 180 (depicted in and further described with respect to FIG. 19). Furthermore, the individual leads themselves can be located using this sensor.

Projecting and determining the shadow edges can be accomplished with other light sources 60 such as light emitting diodes (LEDs) 66 which can be used in place of the more expensive and complex laser diode 62, thereby providing a more economical sensor 45 which still achieves the high degree of accuracy necessary to place the range of components 30 which might be utilized for such a system in which the components 30 range in size from a minuscule grain of sand to quad flat pack components of substantial size. Finally with the use of imaging optics, such as telecentric optics, imaging lenses, or gradient index lenses 78, the sharpness of detail that is required to achieve the necessary degree of accuracy can be obtained as well. In these ways, a less expensive and more dependable sensor 45 can be provided without sacrifice of accuracy or efficiency.

Figure 6A:
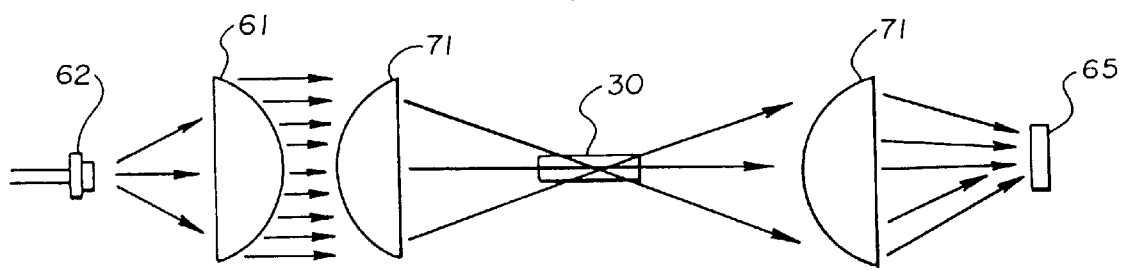
FIG. 6, consisting of FIGS. 6a and 6b, shows side and top views of a preferred embodiment. The sensor of FIG. 6 preferably utilizes a cylinder lens on both sides of the component, thus fully facilitating a substantially greater amount of the energy that is emitted by the low power laser diode to be used in measurement at the detector for this embodiment of the sensor.
Figure 6B:
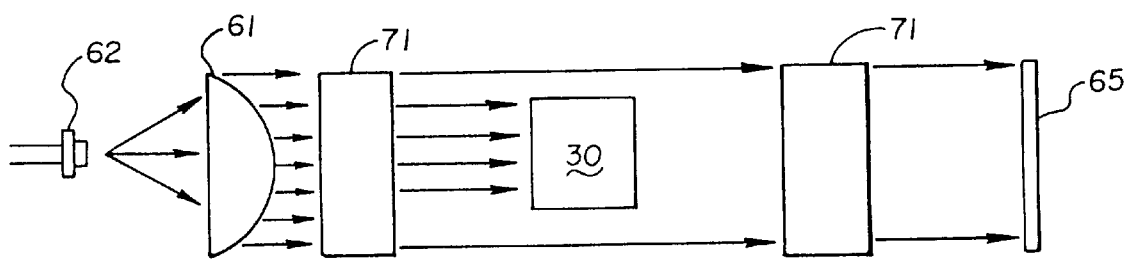

A preferred embodiment of the invention is shown in FIG. 6. As shown in FIGS. 6a and 6b, full light utilization and maximization of optical and energy efficiency is achieved by the use of cylinder lenses 71 on both the source side and receive side of the component 30. FIG. 6a shows the side view and FIG. 6b the top view of the embodiment. A laser diode 62 operating at low power is preferably used to project light towards the collimating lens 61. Alternatively, a condenser lens can be used in place of the collimating lens. As clearly seen in the view of FIG. 6a, light is only focused vertically on the vertical center of the component and the receiver cylinder lens 71 is only collecting light from the center of the component. In this way, any fuzziness, caused by diffraction or reflection of the light in the vertical direction can be minimized or eliminated by sharpening the shadow 90 image as it is cast on the sensor array 65. As clearly seen in the view of FIG. 6b, the shadow of component 30 is passed directly to sensor array 65. The same results can be achieved by reversing the order of position of the collimating lens 61 and the cylinder lens 71. Alternatively, the functions of both of these lenses can be combined in a single astigmatic lens. The preferred embodiment shown in FIG. 6 alternatively works well with an LED, preferably with a small source area.

Because virtually all of the light energy emitted from the laser diode 62 is used in the sensor system of FIG. 6, it has been found that substantially less energy is required with the cylinder lens 71 system and that satisfactory results could be obtained with 10–20 microwatts of power from a laser diode 62 rated at 1–2 milliwatts of output power on the system. Therefore, the present design, as shown in FIG. 6, is at least approximately 100 times more efficient than the laser 62 based design using a slit aperture 75 discussed in the previous patent. Using normally rated laser diodes 62, there is virtually no stress on the device which means the sensor system can be sustained for a substantial amount of time without the need for replacement or repair. Furthermore, due to the increased efficiency of the optical system, the light source could be pulsed. The pulsing action allows the detector to capture a frozen image obtained in a short period of time. This reduces the blur which results from component rotation. When used in this application, references to a low brightness light source, as used when describing the embodiment shown in FIG. 6, and in the other embodiments described below, means either a laser diode operating at much lower than normal laser power, for example, operating a laser diode rated at 2 milliwatts at a 20 microwatt level or an LED. LED's typically project light over a larger area than direct laser light and thus project less emitted energy in the area of interest, i.e., the direction of the component. Therefore, for the purposes of this invention, LEDs are also considered low brightness light sources.

Further, since the cylinder lens 71 focuses the light down to a stripe that is less than 1 mil thick, to strike a component 30 that is over 10 mils thick, all of the light that is produced by the laser diode 62, except for that light passing along the side edges, is blocked by the component 30 with no light passing above or below the component 30. This produces a much darker shadow 90, adding to the image contrast and hence detection accuracy. The sensor system is also less sensitive to defects in the lens 61, 71. Since light is transmitted or collected by a larger section of the lens, the sensor is more resistant to environmental obstructions, dust, dirt and the like.

Figure 7A:
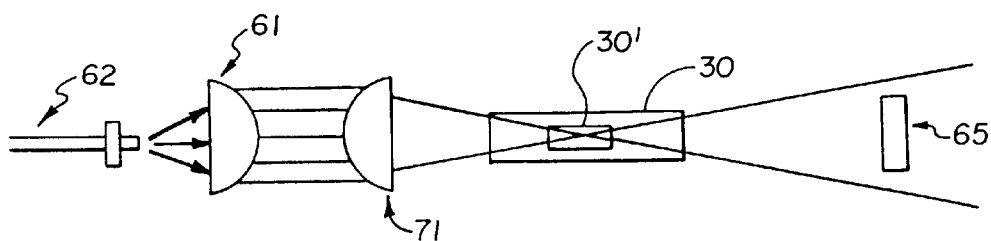
FIG. 7, consisting of FIGS. 7a and 7b, shows side and top views of a laser based sensor using a collimating lens and a cylinder lens on the source side of the sensor. The light from the cylinder lens is shown striking two different components of varying sizes. A large and a small component are shown. The focus from the cylinder lens is such that the thickness of the thin line of light is approximately one order of magnitude less than the thickness of the component being measured. As shown, the shadow is cast completely across the middle of the detector, thereby providing clearly defined dark and light portions on the detector array.
Figure 7B:
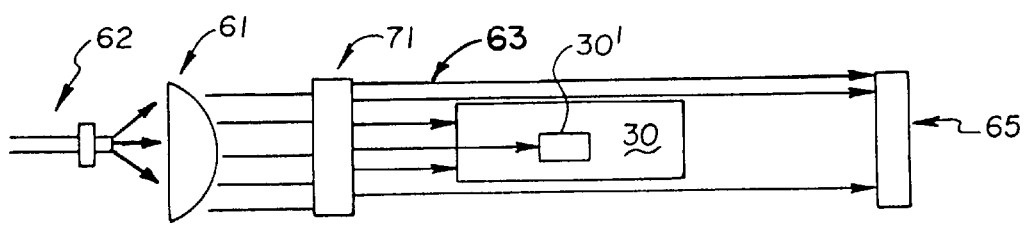

Referring now to an alternative embodiment in FIG. 7, FIG. 7a provides a side view and FIG. 7b a top view of a laser based system using a cylinder lens 71. In the embodiment of FIG. 7, the laser beam 62 is collimated with a collimating lens 61 and then passed through to the cylinder lens 71. The cylinder lens 71 on the source side of the sensor 65 focuses a line of light 63 which ranges in thickness from 2 millimeters adjacent the lens 71, 0.50 millimeter adjacent a larger size component down to 0.025 millimeter at the focal point. This finely focused line of light, therefore, can be used to project a line across a component 30 thereby providing a very dearly defined shadow 90 and dearly defined shadow edges 110, 112 for analysis as more fully described below. Detection error is decreased in this embodiment because the light is focused on the component in such a way so that light is not allowed to escape either above or below the component. Light will only pass along the side edges. Therefore, no image is collected from the top of the component where confusion could be introduced due to detection errors arising from projection of the nozzle shadow onto the array or from extraneous light passing below the component.

Figure 8A:
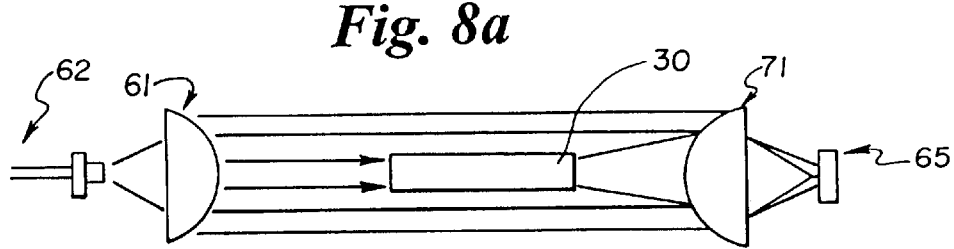
FIG. 8, consisting of FIGS. 8a and 8b, shows the side and top views of a similar sensor with a collimating lens on the source side of the sensor and a cylinder lens on the receive side. The image of the shadow is sharply focused on the detector array with the use of the cylinder lens on the receive side. The cylinder lens has the effect of sharply focusing only the light narrowly escaping the component edges to a line on the detector.
Figure 8B:
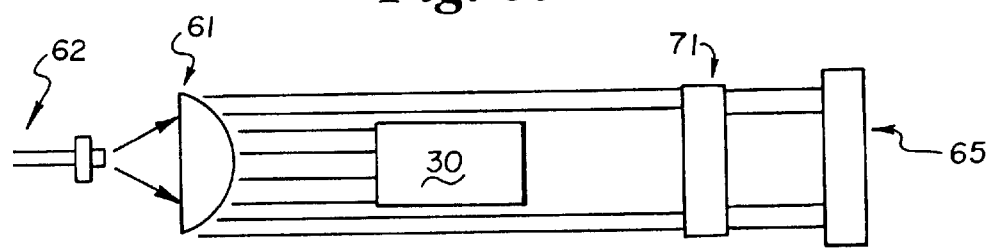

As shown in FIGS. 8a and 8b, advantages can also be achieved with the movement of the cylinder lens 71 to the receiver side of the sensor system. Using a collimating lens 61 to align the lower power light, the cylinder lens 71 is then used to focus the resulting light pattern 102, 103 and shadow 90 directly on the diode array 65. This embodiment has the effect of sharply focusing an image of the center of the component 30 on to the detector 65. Light rays passing above or below the component 30 will not be imaged onto the narrow row of detectors on the detector array 65.

As will be apparent to those skilled in the art, the design of the present invention can be combined with the design of the prior invention by using a cylinder lens 71 on the receiver side of the sensor 45 and optionally a slit aperture 75 on the source side. The added benefit of the cylinder lens 71 on the receiver side would be to sharpen the image on the detector elements 65 so as to get a more accurate and clearly defined shadow 90. This improved clarity can be used to conserve some energy from the laser diode 62, but not to the extent of the design of FIG. 6, where two cylinder lens 71 are fully utilized.

Generally, it is not advantageous to utilize light emitting diodes (LEDs) 66 in a configuration similar to that disclosed in connection with the prior U.S. patent. This is because a LED 66 is usually a broad, wide area source. It radiates low light brightness because the power comes from a large area. The comparison of source size between an LED 66 and a laser 62 source is on the order of 500 microns versus 2 microns, which leads to the ability of the smaller laser source to create a much sharper shadow image. However, with the use of optics 61, 71 in a manner similar to that described above and shown previously in FIGS. 6–8 or as described or shown in conjunction with FIGS. 9 and 10, the disadvantages of using a light emitting diode 66 as a source 60 can be overcome resulting in a great enhancement of the efficiency of an LED based sensor system.

Figure 9A:
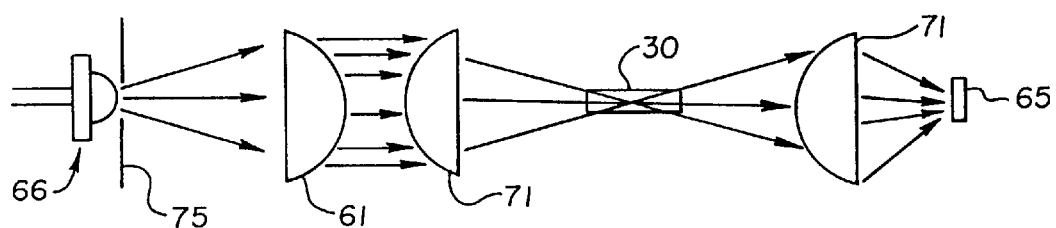
FIG. 9, consisting of FIGS. 9a and 9b, shows the side and top views of an embodiment similar to a preferred embodiment shown in FIG. 6 with the primary exception of a broad area light emitting diode (LED) light source. An aperture is interposed between the broad area LED light source and the collimating lens to create a sensor which is similar to that created with a point source of light As in the preferred embodiment shown in FIG. 6, the sensor system of FIG. 9 also utilizes a cylinder lens on both sides of the component to collect a greater amount of illuminated light emitted from the laser diode at the detector.
Figure 9B:
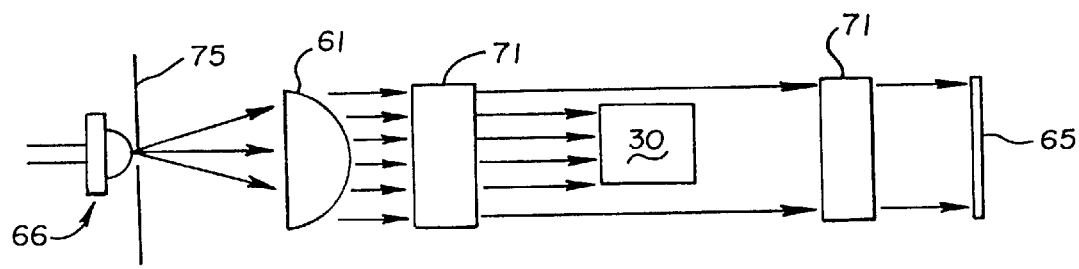

As discussed, the primary objective is to have light emanate from a point source. Therefore, one alternative solution is to interpose an aperture 75 between the LED light source 66 and the collimating lens 61, as shown in FIG. 9. FIGS. 9a and 9b display an embodiment essentially the same as the preferred embodiment shown in FIG. 6 with the use of cylinder lenses 71 on both the source and receiver side, except the embodiment in FIG. 9 uses an LED with a broad source area. This embodiment decreases the light emission to be equivalent to that of a point source enhancing the sharpness of shadows 90 cast by such a configuration. However, as will be obvious to those skilled in the art, there will be energy losses by virtue of the light energy striking the apertured optical filter 75.

Figure 10A:
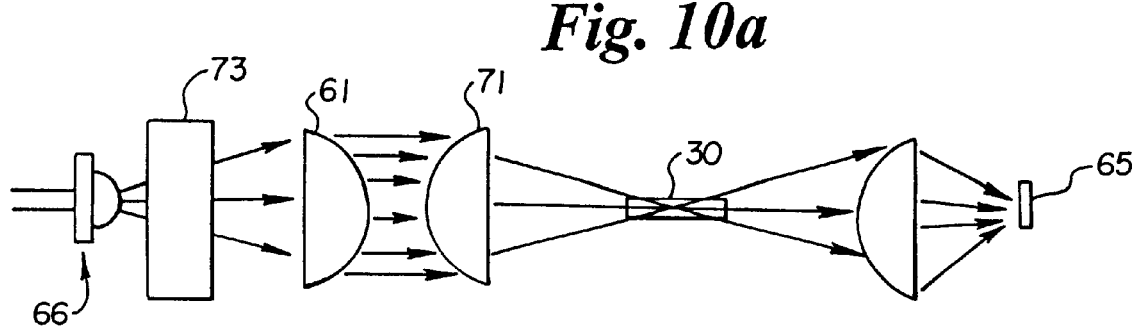
FIG. 10, consisting of FIGS. 10a and 10b, shows the top and side views of an embodiment similar to that in FIG. 9 except the embodiment in FIG. 10 uses a negative lens to make the broad area LED appear to the sensor system to be much farther removed from the sensor system and therefore appear as a point source so that the purposes of the previous sensor systems are achieved.
Figure 10B:
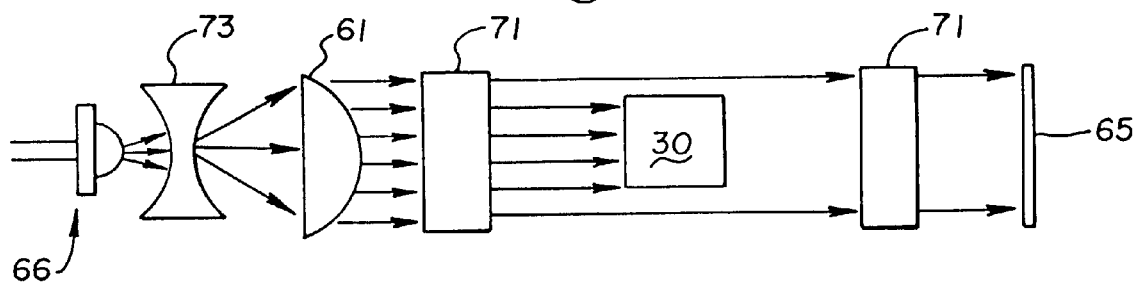

Another method is the use of a negative lens 73 interposed between the light emitting diode 66 and the collimating lens 61, as shown in FIGS. 10a and 10b. As is known to those familiar with optics, the negative lens 73 serves to decrease the apparent source size of the light emitting diode 66 producing substantially better collimization of light passing through the collimating lens 61 of FIG. 10.

Figure 11A:
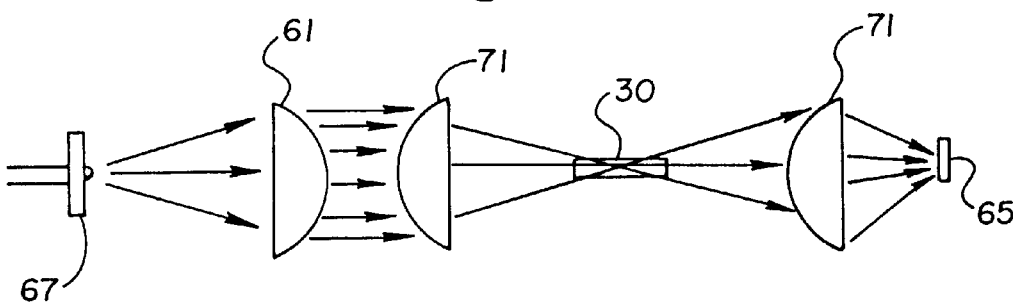
FIG. 11, consisting of FIGS. 11a and 11b, shows the side and top views of an embodiment using a small area LED where the small area LED allows the sensor to achieve similar results as those sensors shown in FIGS. 9 and 10 while dispensing with the necessity of using either the aperture or negative lens shown in those figures.
Figure 11B:
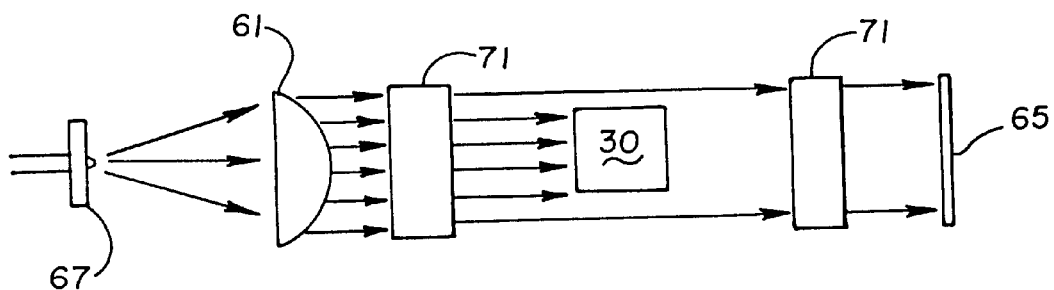

Finally, as shown in the side and top views of the embodiment in FIGS. 11a and 11b, it is possible to also produce a sharp image at the detector array 65 by using a small area LED light source 67. The use of a small area LED light source 67 dispenses with the requirement of using either an aperture 75 or negative lens 73 as required in the broad source area LED 66 embodiments shown in FIGS. 9 and 10. A condenser or collimating lens 61, however, is still necessary to project as much light as possible past the component 30 to the detector array 65. Furthermore, the sensor system in FIG. 11 also interposes the cylinder lens 71 on both sides of the component 30 to collect more of the radiated light and project a correspondingly sharper image on the detector array 65. It will additionally be appreciated that the size of the LED source 67 in FIG. 11 can be larger if the focal length of the lens 61 is made longer and the LED is correspondingly placed further from the laser. The increased distance makes the angular width of the source small, which is the intent of all embodiments in FIGS. 9–11.

As was mentioned above in connection with FIG. 6, the positions of the collimating, or condenser, lens and the cylinder lens can be reversed to achieve the same light focusing effect. Alternatively, a single astigmatic lens can be used in place of the collimating, or condenser, lens and cylinder lens configuration to achieve the same light focusing results on the source side of the component.

Figure 12:
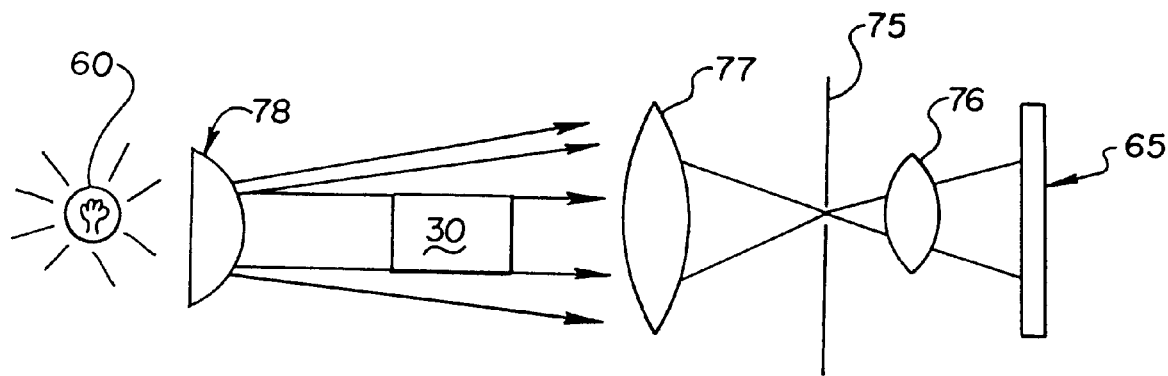
FIG. 12 shows a light source which could be a low power laser light source, an LED or any other light source, where a condenser lens is used to direct as much light as possible passed the component. Using a telecentric lens system comprising two lenses and a telecentric stop, an image of the component is created at the detector which is a clearer and sharper image of the light shadow created by the component, allowing more accurate detection of component or lead edges.
Figure 13:
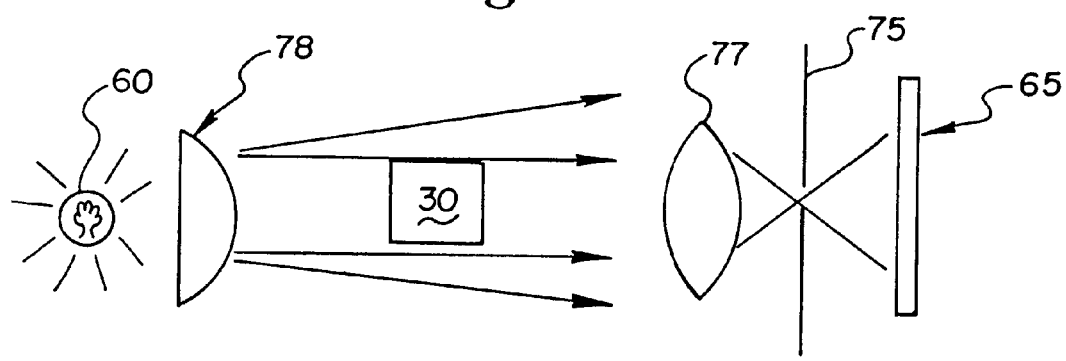
FIG. 13 shows an embodiment similar to that in FIG. 12 except without the interposition of the imaging lens between the aperture and detector. This telecentric embodiment also meets the purposes of a telecentric lens system, i.e., to maintain constant image size over a range of component distances from the detector or for a range of component sizes. However, in some cases the image will not appear as clear or sharp as that which is obtainable using the embodiment shown in FIG. 12.
Figure 14:
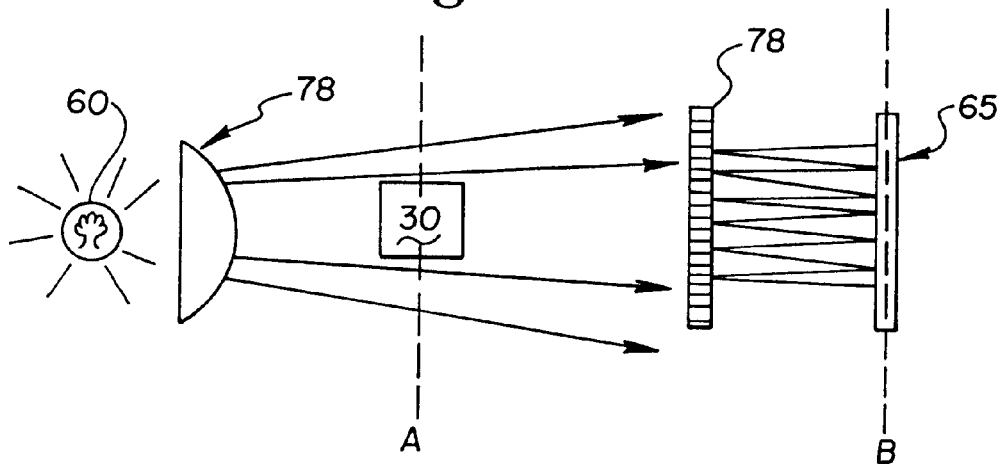
FIG. 14 shows a second form of imaging lens system, where a gradient index lens system, consisting of a series of specially doped glass rods, is used to focus a precise image of the component on the sensor array. Each GRIN lens forms an image of a small area of the component on the sensor array. The advantage of the GRIN lens array is that much less space is required than for an equivalent imaging system using a single conventional lens on the receive side. The GRIN lens array provides short optical path length and wide apertures.

Finally, three embodiments are shown in FIGS. 12–14 which employ imaging systems. The telecentric lens configurations in FIGS. 12 and 13 sharply focus an image completely contained within the confines of the detector 65 over a wide range of distances of the component 30 from the lens 77 or regardless of the size of the component 30. Telecentric lens systems are a well known type of imaging lens which have the feature of maintaining constant image size over a range of object distances from the lens. Telecentric lens systems work by using a lens 77 and aperture 75 to select only the collimated portion of the received light. Therefore the light source 60 is effectively collimated at the receiver side of the sensor. Although a small source and condenser lens 78 are shown on the source side in FIGS. 12 and 13, an adequately sharp image can still be projected onto the detector 65 if the small source and condenser 78 were replaced by a large area source. However, it is preferred that the condenser lens 78, or a collimating lens 71, be included to direct as much light as possible past the component 30.

Telecentric operation can be achieved in FIGS. 12 and 13 with a large lens 77 placed between the component 30 and the detector 65 with a small aperture 75 interposed between the lens 77 and the detector 65. The purpose of the large lens 77 is to collect the collimated portion of the light passing the component 30 and to focus that light at the center of the aperture 75. As with the collimating lenses 61 discussed earlier, only rays parallel to the axis are used for determination. Because the lens 77 collects primarily only the parallel light passing by the sides of the component 30, the lens 77 must be at least as large as the component 30. Again, if the aperture 75 is at approximately the focal length of the lens, then the image generated by parallel rays to the lens 77 will be cast through the aperture 75 to reproduce a sharp image on the sensor array 65. Other, non-parallel light will be blocked by the carrier of the aperture 75. Even more enhanced operation over that of the embodiment shown in FIG. 13 can be achieved with the use of an imaging lens 76 near the detector array 65, as shown in FIG. 12, which will sharply focus the image with reduced distortion for purpose of analysis and measurement.

Similar imaging operation may be achieved with Gradient Index (GRIN) lenses 78 on the receiver side as shown in FIG. 14. One disadvantage of using an imaging system in the receiver optics is that the size of the sensor must increase to accommodate the required distance from the imaging lens to the detector array 65 to account for the necessary focal path length. The use of the GRIN lens array 78 alleviates this problem by reducing the field of view of each lens and thereby reducing the required lens diameters and focal lengths. A GRIN lens array 78 consists of a series of glass rods in each of which a double inversion of the image occurs. Each rod is a small diameter lens that forms a 1:1 image on the sensor array 65. Referring to FIG. 14, each of the GRIN lenses images a portion of plane A, as shown at the component 30, onto a corresponding portion of plane B, as shown at the sensor array 65. The resulting composite image 90 is suitably crisp for determination in the manner described below. In an alternative embodiment, if high resolution and large depth of field are required, a set of lens slices with differing focal lengths can be interposed on the receiver side of the optics. Each slice would image a different line onto the detector. The correct lens slice is chosen as a function of the height at which the component is positioned.

Figure 15A:
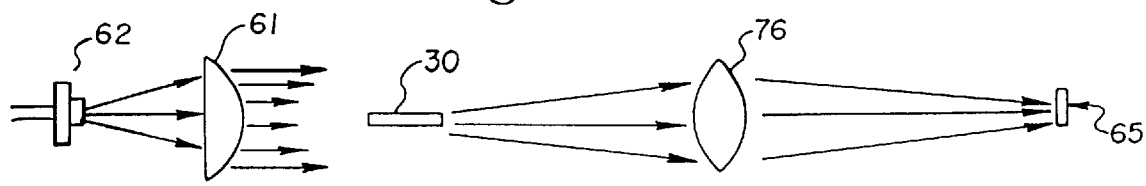
FIG. 15, consisting of FIG. 15a and 15b, shows the side and top views of a simple imaging lens system, where a condenser or collimating lens is used to direct light passed the component and through an imaging lens which sharply focuses the image on the sensor array.
Figure 15B:
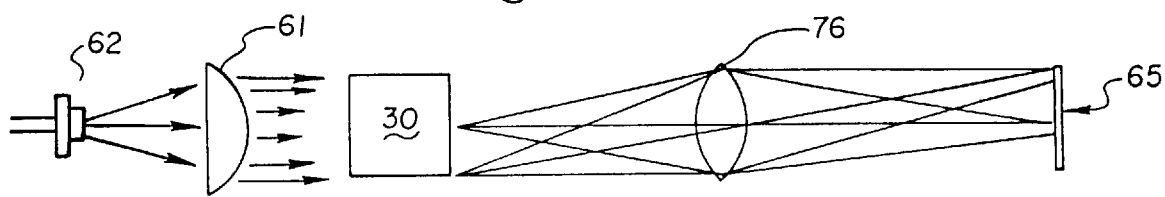

FIG. 15 shows an embodiment simply using an imaging lens 76 on the receiver side to image the component 30 onto the sensor array 65. While sharply focused images can be detected on the sensor array 65, the disadvantage of this configuration is that it requires a large distance between the component 30 and detector 65 due to the requirement that the lens diameter be larger than the component 30 and large diameter lenses in practice have relatively long focal lengths.

Figure 16A:
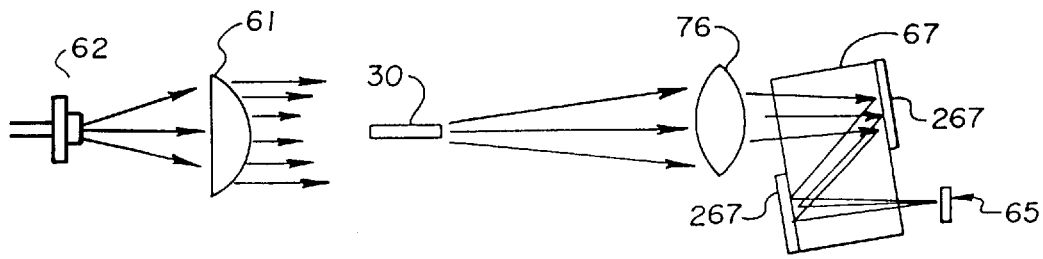
FIG. 16, consisting of FIGS. 16a and 16b, shows the side and top views of an alternative imaging lens system where focused light from the imaging lens is reflected off of the ends of a glass block, interposed between the imaging lens and sensor array, to fold the optical path before the light exits to fall onto the sensor array. Portions of the glass block reflective coatings, such as aluminum, to ensure high reflectivity. This embodiment has the advantage of shortening the required distance between the image lens and sensor array, thereby conserving sensor space. Such glass blocks may be used in either the source, the receiver, or both sides of the sensor system. The glass block could be replaced by space mirrors or other optical component whose purpose is to fold and shorten the physical space required for the optical system.
Figure 16B:
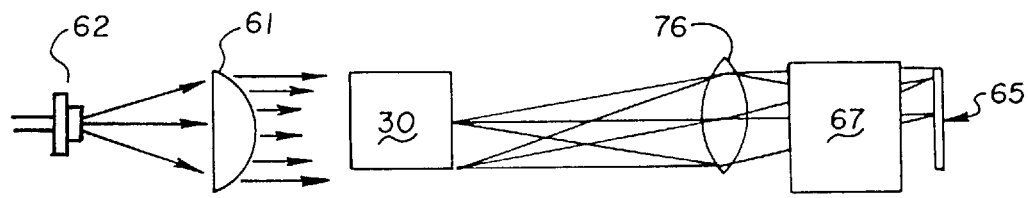

An alternative embodiment to reduce the required distance from a lens arrangement and the sensor array 65 is to use multiple reflective surfaces to fold the optical path. A second alternative embodiment comprises the interposition of a glass block 67 between the imaging lens 76 and the sensor array 65, as shown in FIG. 16. In this embodiment, the optical path is folded due to reflections off the end of the glass block 67. The reflective surfaces 267 cause the light to pass through the block 67 several times before allowing the light to exit near the bottom of the block 67 and produce the shadow image on the sensor array 65.

Figure 17A:
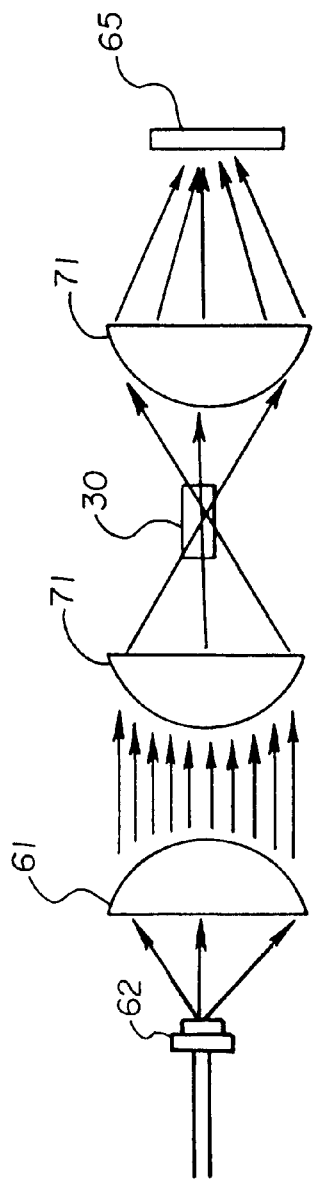
FIG. 17, consisting of FIGS. 17a and 17b, shows the side and top views of a configuration similar to that shown in FIG. 6 except with the addition of a second detector for alignment of components on two adjacent quills.
Figure 17B:
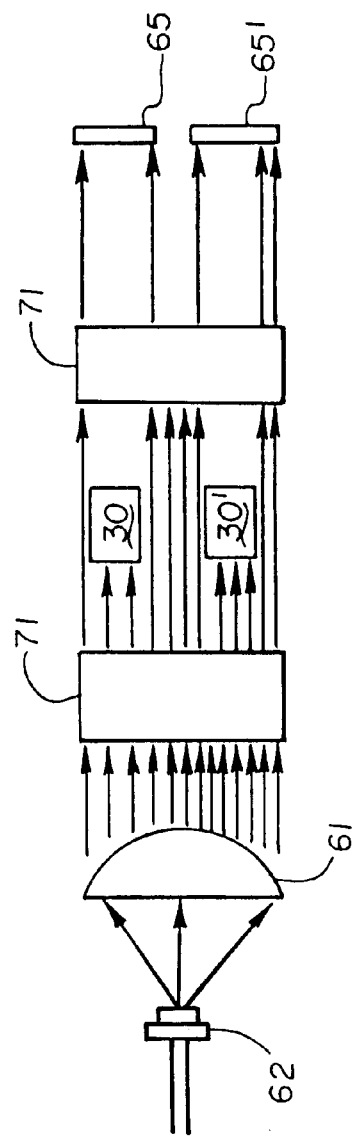

The embodiments described above can be utilized to position more than one component simultaneously through the use of more than one detector. One such embodiment is shown in FIG. 17, consisting of FIG. 17a showing a side view and FIG. 17b showing a top view. The embodiment shown in FIG. 17 comprises a single source 62, two quills 24 (not shown in FIG. 17) for holding and retracting the components 30, 30' into the focused light beam, a focusing lens system on the source side to direct as much light as possible past the component 30, a receiver lens configuration and two sensor arrays 65, 65'; sensor array 65 captures the shadow or image cast by the first component 30 and second array 65' captures the shadow or image cast by the second component 30'. Since the components are not expected to be in alignment with each other, the processing from the arrays is done separately for each component. In this manner, one set of optics can be utilized to accurately align two components at the same time. Furthermore, if the two components are small then it is also possible to align both components using only one detector 65. This is done by using software or electronic hardware to process two areas on the linear array as if they were two different arrays. Note that FIG. 7 also depicts a system where two components 30, 30' are in place.

Figure 18A:
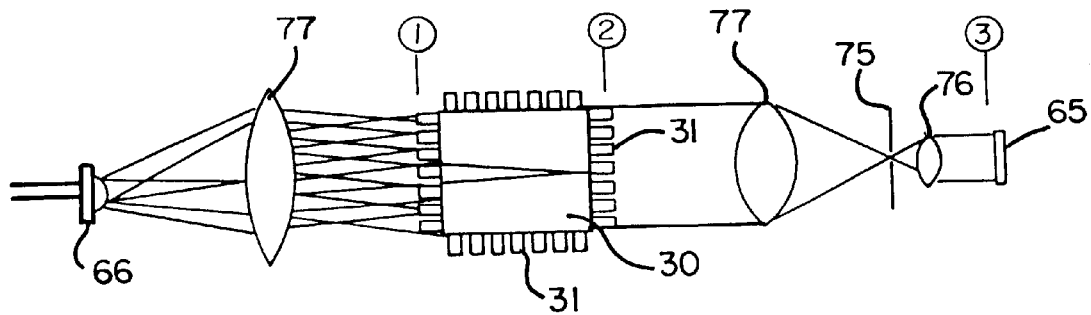
FIG. 18, consisting of FIGS. 18a and 18b, shows the top and side views, respectively, of a lead measurement system. A broad source is used so that light from various angles can pass through the leads of a component and sharply focus the leads by a telecentric optical system onto the detector.
Figure 18B:
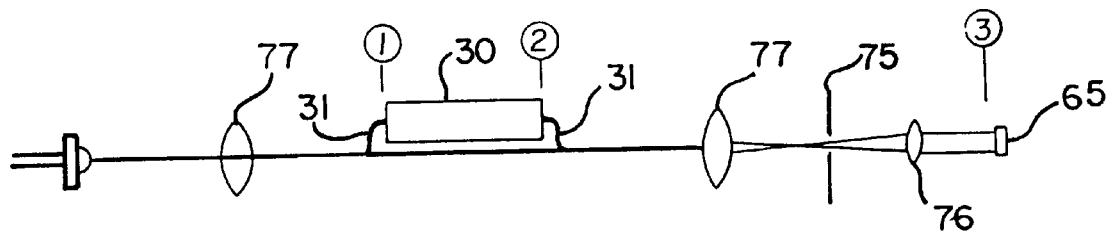

FIG. 18, consisting of FIGS. 18a and 18b, shows the top and side views, respectively, of a lead measurement system.

A broad source 66 is used so that light from various angles can pass through the leads 31 of a component 30 in plane 1 to somewhat uniformly illuminate the leads 31 in plane 2. The leads 31 in plane 2 are sharply focused by the telecentric optical system, similar to the embodiment of FIG. 12, onto plane 3 where the detector is located. With this data, it is possible to determine lead 31 position by directly reading off lead edge data on the detector 65.

Figure 19:
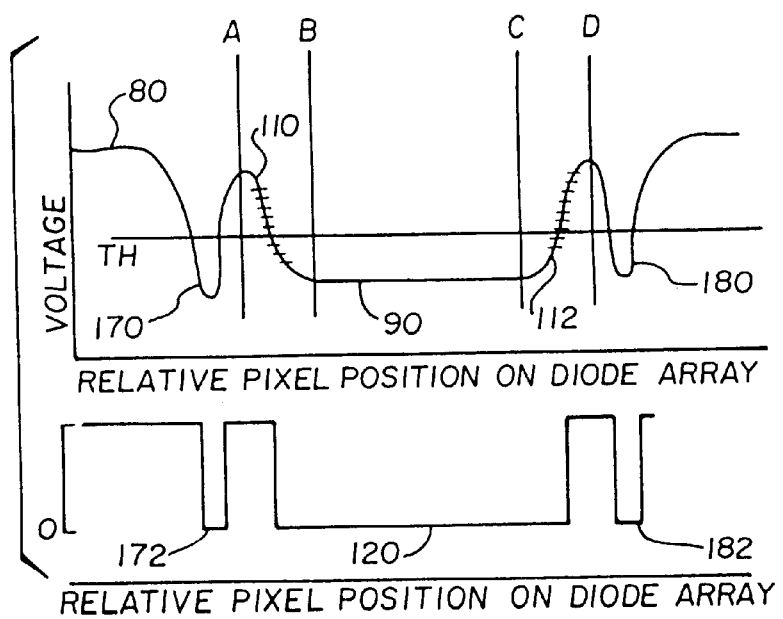
FIG. 19 illustrates diagrammatically one method for achieving angular orientation and lateral position.
Figure 20:
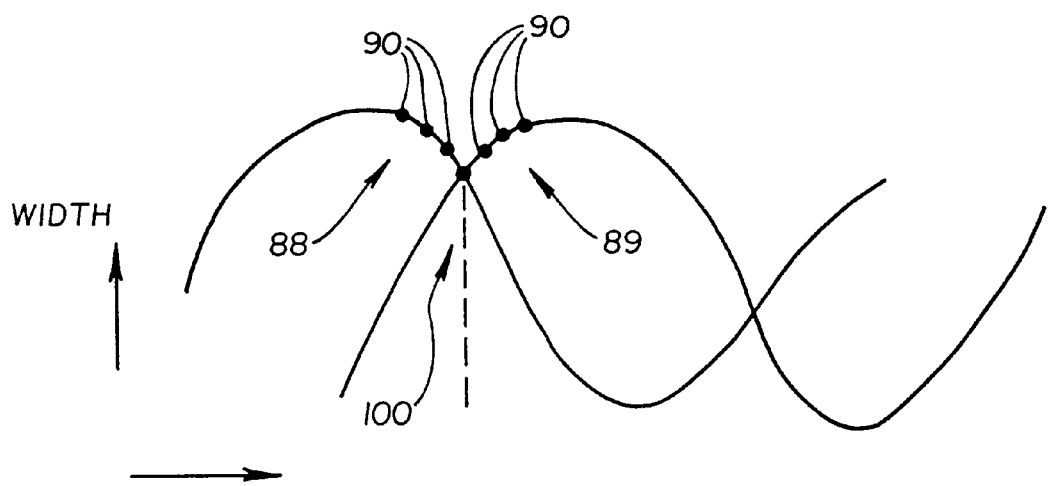
FIG. 20 shows graphically a sinusoidal fitting algorithm that can be used to precisely locate the edge of the component when it is in alignment. The decreasing measurements as the component is rotated into alignment are compared sinusoidally with the increasing measurements as the component is rotated out of alignment. Using the point where these two sinusoidal measurements intersect, the precise angle of alignment of the component can be found.
Figure 21:
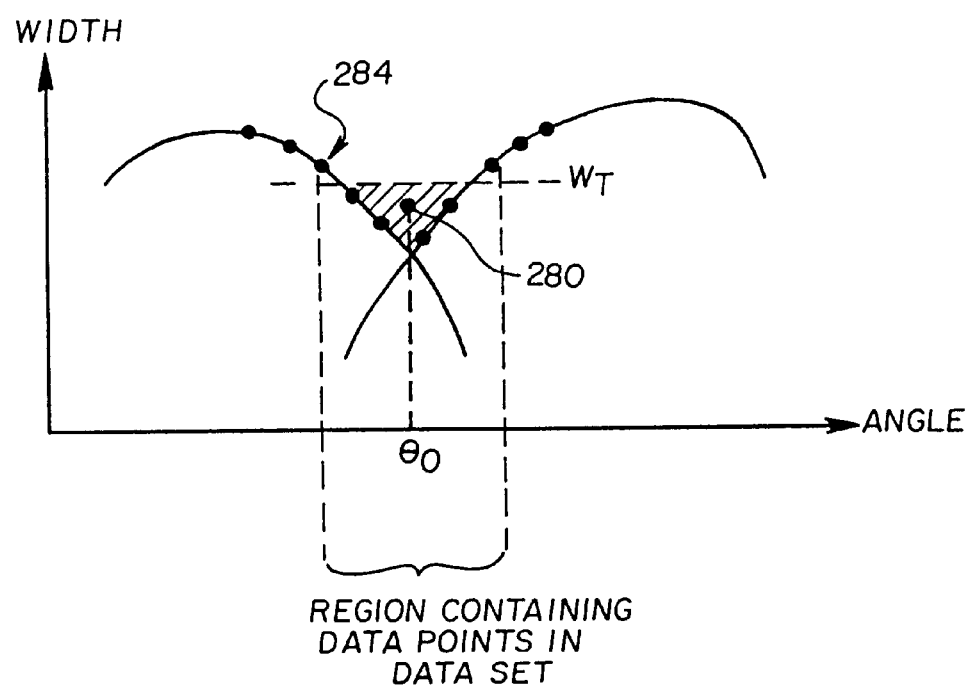
FIG. 21 shows graphically a centroid calculation process that can be used to find the correct angular alignment of the component. This algorithm finds the centroid of a set of component width measurements, the angle of the resulting centroid defining the correct alignment angle.

FIGS. 19, 20 and 21 show various methods of processing the data to a high degree of accuracy. The range of part 30 widths which are to be analyzed by the alignment and position sensor 43 normally range from 0.02 to 2 inches and can be larger. It is neither practical nor necessary to retain and analyze all data 80 from the over 3,000 element diode array 65. It is necessary to obtain and analyze only the data 80 which is relevant to either one or both of the edges 110, 112 of the shadow 90 which are cast by the component 30 on the diode array 65. Referring to FIG. 19, there are two zones, A–B, C–D of primary interest, one A–B is the leading edge 110 of the shadow 90 and the other C–D is the trailing edge 112 of the shadow 90. In other words the data in zone A–B defines the edge of the shadow caused by one side of the component, and the zone C–D the edge caused by the opposite side.

Using the defined edges 110, 112, as shown in zones A–B and C–D, the part 30 can be aligned. Initially the component 30 is picked up in a position which is known to be misaligned and will, hence, cast a larger shadow 90. The component 30 is then rotated by the component placement head 43 and the angular position at which the shadow 90 width is minimized is noted. In the earlier patent the component was prealigned to a position known to be out of alignment for purposes of casting a larger shadow on the array 65. This pre-alignment move now is eliminated by preferably rotating the sensor by some pre-alignment position, preferably five to fifteen degrees. The edge positions, when the shadow 90 is narrowest and their deviation from the center of the quill 24 are noted as well. These positions allow calculation of the lateral position of the part. The component can then be rotated 90° and the orthogonal lateral position determined, based again on the comparison of the center of the shadow 90 of the component 30, as determined by one or both of the edge 110, 112 positions, with the center of the quill 24. Components can also be aligned based on the positions of the leads 31. For example, the lead shadow edges, 170 and 180, as shown in FIG. 19, can be used to align the component using any of the processes described herein.

As the width of the shadow 90 decreases due to the component 30 being rotated into alignment, photodiode elements located on the edge 110 of the shadow 90 will receive increasingly more light, until the point at which the shadow 90 width is minimum. As the component continues to rotate, the shadow width increases and the amount of light falling on the same photo elements will begin to decrease. Thus, we are able to accurately orient the component 30 parallel to the laser beam by finding an accurate position of the shadow edge.

One method which can be used, which is represented in FIG. 19, is the use of a threshold voltage ($V_{TH}$) and a comparator or discriminator which converts the analog data 80 from the diode array 65 to a digital representation 120 by detecting when the voltage on each element of the array 65 falls below the threshold voltage $V_{TH}$ thereby indicating that the shadow 90 of the component 30 has been detected.

Preferably each element in the array 65 is sequentially read at a five megahertz data rate and compared with the threshold voltage $V_{TH}$. The pixel count, where the data 80 reading first falls below the threshold voltage, is used as a latch signal and the number of data readings immediately preceding and immediately following a first occurrence is stored in a data buffer as the leading edge 110 of the shadow. Although any number of data points can be stored, 32 pixels preceding and following the first latch signal (A–B) has been found satisfactory, providing a total of only 128 items of data (A–B, C–D) necessary to analyze the precise angular orientation and lateral position of the component 30.

Similarly, data can be read and stored for the trailing edge of the shadow 112 when the data signals first rise above the threshold voltage $V_{TH}$. This data is then stored as the data for the current shadow edge positions.

In the prior patent, various algorithmic expedients were described to determine precisely each edge of the component as it rotates into alignment. Additional algorithmic approaches can be utilized to precisely determine the position of the edge. For example, the edge data 82 is not linear but instead is sloped because of the effects of reflection and diffraction from the edge of the component 30 as it rotates into alignment. The precise location of the edge in the analysis area can be determined by taking the first derivative of the various data points 82 in the zones 110, 112 or alternatively 170, 180. Where the slope of the shadow 90 is steepest, that is the most likely location of the edge. Maintaining data 82 on the precise edge location, i.e., where the first derivative peaks, identifies the location of the edge for each change in angle, $\Delta\theta$.

Also, the precise edge locations, as the component 30 rotates into alignment, will decrease and, after the component 30 begins to rotate out of alignment, the shadow 90 width will increase. As is known to those skilled in the art, the plots that result from the varying positions of the rotating edges will be sinusoidal. The data plots are shown in FIG. 20. Further, the point 100 where the decreasing sinusoid 88 intersects with the increasing sinusoid 89, precisely locates the edge when it is in alignment. As a consequence, after the measurement process has been completed, the component can be rotated back to the intersection of the sinusoids 88, 89 for the highest degree of accuracy.

Alternatively, a centroid finding algorithm can be used to determine component alignment. The approximate angle of the component can be determined by way of any number of means. For example, the angle at which the smallest width of component shadow is measured can be used as the approximate angle for purposes of this algorithm. As shown in FIG. 21, a region of some fixed number, n, of width measurements 284 centered around this approximate angle is taken as a data set for further calculation. A threshold width, $W_T$, is calculated based on the widths in the selected data set. As shown in FIG. 20, a region is defined which is bounded below by the individual width measurements 284 in the data set and bounded above by the threshold width. The centroid 280 of this region is then calculated. The angle $\theta_0$ of the centroid is used as the alignment angle. The component 30 can then be placed in correct angular alignment. The advantages of this method are that this method improves the noise immunity of the alignment calculation over the minimum width angle method for alignment and also leads to higher resolution.

Using the foregoing embodiments, methods and processes, a very fast, extremely accurate, high resolution sensing system is achieved which can precisely locate a component for placement of that component on circuit boards which are within the requirements of today's technology. It will be clear to those skilled in the art that many varied modifications and variations can be made in the many embodiments shown and described. All such variations and modifications are intended to be within the scope of the appended claims.

Having described our invention, we claim:

1. A highly efficient and precise component alignment sensor system for aligning a component, said component presenting a first component axis and a second component axis, said first and second component axes oriented generally transverse to each other, the sensor system comprising:
    a component carrier for selectively positioning the component in a component measuring station;
    a light source oriented to project light energy generally in the direction of said component measuring station;
    a multi-element sensor array oriented to receive light energy from said light source, the light energy received by said multi-element sensor array being differentiated by the shadow cast by said component when said component is within said component measuring station;
    an optical element placed between said light source and said component measuring station, said optical element designed to capture a substantial portion of said light energy and concentrate said light energy generally along said first component axis when said component is in said component measuring station so as to present a generally narrow band of concentrated light energy along said first component axis, the optical element projecting onto said multi-element sensor array a focused image along said first component axis and a shadow along said second component axis when said component is in said component measuring station; and
    processing means for calculating an angular and coordinate position of said component, comprising:
        means for collecting data representative of the light energy received by said multi-element sensor array; and
        means for analyzing said data to determine the correct alignment of said component.

2. The sensor system of claim 1, wherein said light source comprises a laser diode.

3. The sensor system of claim 1, wherein said light source comprises a broad area light emitting diode.

4. The sensor system of claim 3, wherein said optical element comprises an apertured optical filter, a collimating lens and a first cylinder lens and wherein said apertured optical filter is interposed between said broad area light emitting diode and said collimating lens, said collimating lens is interposed between said apertured optical filter and said first cylinder lens, and said first cylinder lens is interposed between said collimating lens and said component measuring station.

5. The sensor system of claim 4, further comprising a second cylinder lens interposed between said component in said component measuring station and said multi-element sensor array.

6. The sensor system of claim 3, wherein said optical element comprises a negative lens, a collimating lens, and a first cylinder lens and wherein said negative lens is interposed between said broad area light emitting diode and said collimating lens, said collimating lens is interposed between said negative lens and said first cylinder lens, and said first cylinder lens is interposed between said collimating lens and said component measuring station.

7. The sensor system of claim 6, further comprising a second cylinder lens interposed between said component in said component measuring station and said multi-element sensor array.

8. The sensor system of claim 1, wherein said light source comprises a small area light emitting diode.

9. The sensor system of claim 8, wherein said optical element comprises a collimating lens and a first cylinder lens, and wherein said collimating lens is interposed between said small area light emitting diode and said first cylinder lens and said first cylinder lens is interposed between said collimating lens and said component measuring station.

10. The sensor system of claim 9, further comprising a second cylinder lens interposed between said component in said component measuring station and said multi-element sensor array.

11. The sensor system of claim 1, wherein said optical element comprises a collimating lens and a first cylinder lens, and wherein said collimating lens is interposed between said light source and said first cylinder lens and said first cylinder lens is interposed between said collimating lens and said component measuring station.

12. The sensor system of claim 11, further comprising a second cylinder lens interposed between said component in said component measuring station and said multi-element sensor array.

13. The sensor system of claim 1, wherein the sensor system is designed to align at least two components.

14. The sensor system of claim 13, wherein said multi-element sensor array comprises at least two multi-element sensor arrays.

15. The sensor system of claim 1, wherein said light source is pulsed.

16. A highly efficient and precise component alignment sensor system for aligning a component, said component presenting a first component axis and a second component axis, said first and second component axes oriented generally transverse to each other, the sensor system comprising:
    a component carrier for selectively positioning the component in a component measuring station;
    a light source oriented to project light energy generally in the direction of said component measuring station;
    a multi-element sensor array oriented to receive light energy from said light source, the light energy received by said multi-element sensor array being differentiated by the shadow cast by said component when said component is within said component measuring machine;
    a plurality of optical elements placed between said light source and said component measuring station, said plurality of optical elements designed to capture a substantial portion of said light energy and concentrate said light energy generally along said first component axis when said component is in said component measuring station so as to present a generally narrow band of concentrated light energy along said first component axis, the optical element projecting onto said multi-element sensor array a focused image along said first component axis and a shadow along said second component axis when said component is in said component measuring station; and
    processing means for calculating an angular and coordinate position of said component, comprising:
        means for collecting data representative of the light energy received by said multi-element sensor array; and
        means for analyzing said data to determine the correct alignment of said component.

17. The sensor system of claim 16, wherein said light source comprises a laser diode.

18. The sensor system of claim 16, wherein said light source comprises a broad area light emitting diode.

19. The sensor system of claim 18, wherein said plurality of optical elements comprises an apertured optical filter, a collimating lens, and a first cylinder lens, and wherein said apertured optical filter is interposed between said broad area light emitting diode and said collimating lens, said collimating lens is interposed between said apertured optical filter and said first cylinder lens, and said first cylinder lens is interposed between said collimating lens and said component.

20. The sensor system of claim 19, further comprising a second cylinder lens interposed between said component in said component measuring station and said multi-element sensor array.

21. The sensor system of claim 18, wherein said plurality of optical elements comprises a negative lens, a collimating lens and a first cylinder lens, and wherein said negative lens is interposed between said broad area light emitting diode and said collimating lens, said collimating lens is interposed between said negative lens and said first cylinder lens, and said first cylinder lens is interposed between said collimating lens and said component measuring station.

22. The sensor system of claim 21, further comprising a second cylinder lens interposed between said component in said component measuring station and said multi-element sensor array.

23. The sensor system of claim 16, wherein said light source comprises a small area light emitting diode.

24. The sensor system of claim 23, wherein said plurality of optical elements comprises a collimating lens and a first cylinder lens, and wherein said collimating lens is interposed between said small area light emitting diode and said first cylinder lens and said first cylinder lens is interposed between said collimating lens and said component measuring station.

25. The sensor system of claim 24, further comprising a second cylinder lens interposed between said component in said component measuring station and said multi-element sensor array.

26. The sensor system of claim 16, wherein said plurality of optical elements comprises a collimating lens and a first cylinder lens, and wherein said collimating lens is interposed between said light source and said first cylinder lens and said first cylinder lens is interposed between said collimating lens and said component measuring station.

27. The sensor system of claim 26, further comprising a second cylinder lens interposed between said component in said component measuring station and said multi-element sensor array.

28. The sensor system of claim 16, wherein the sensor system is designed to align at least two components.

29. The sensor system of claim 16, wherein said light source is pulsed.

30. The sensor system of claim 16, wherein said multi-element sensor array comprises at least two multi-element sensor arrays.

31. A highly efficient and precise component alignment sensor system for aligning a component, said component presenting a first component axis and a second component axis, said first and second component axes oriented generally transverse to each other, the sensor system comprising:
   a component carrier for selectively positioning the component in a component measuring station;
   a single light source oriented to project light energy generally in the direction of said component measuring station;
   a multi-element sensor array oriented to receive said light energy from said single light source, the light energy received by said multi-element sensor array being differentiated by the shadow cast by said component when said component is within said component measuring station;
   a plurality of optical elements placed between said single light source and said component measuring station, said plurality of optical elements designed to capture a substantial portion of said light energy and concentrate said light energy generally along said first component axis when said component is in said component measuring station so as to present a generally narrow band of concentrated light energy along said first component axis, the optical element projecting onto said multi-element sensor array a focused image along said first component axis and a shadow along said second component axis when said component is in said component measuring station; and
   processing means for calculating an angular and coordinate position of said component, comprising:
      means for collecting data representative of the light energy received by said multi-element sensor array; and
      means for analyzing said data to determine the correct alignment of said component.

32. The sensor system of claim 31, wherein said single light source comprises a laser diode.

33. The sensor system of claim 31, wherein said single light source comprises a broad area light emitting diode.

34. The sensor system of claim 33, wherein said plurality of optical elements comprises an apertured optical filter, a collimating lens, and a first cylinder lens, and wherein said apertured optical filter is interposed between said broad area light emitting diode and said collimating lens, said collimating lens is interposed between said apertured optical filter and said first cylinder lens and said first cylinder lens is interposed between said collimating lens and said component measuring station.

35. The sensor system of claim 34, further comprising a second cylinder lens interposed between said component in said component measuring station and said multi-element sensor array.

36. The sensor system of claim 33, wherein said plurality of optical elements comprises a negative lens, a collimating lens and a first cylinder lens, and wherein said negative lens is interposed between said broad area light emitting diode and said collimating lens, said collimating lens is interposed between said negative lens and said first cylinder lens, and said first cylinder lens is interposed between said collimating lens and said component measuring station.

37. The sensor system of claim 36, further comprising a second cylinder lens interposed between said component in said component measuring station and said multi-element sensor array.

38. The sensor system of claim 31, wherein said single light source comprises a small area light emitting diode.

39. The sensor system of claim 38, wherein said plurality of optical elements comprises a collimating lens a first cylinder lens, and wherein said collimating lens is interposed between said small area light emitting diode and said first cylinder lens and said first cylinder lens is interposed between said collimating lens and said component measuring station.

40. The sensor system of claim 39, further comprising a second cylinder lens interposed between said component in said component measuring station and said multi-element sensor array.

41. The sensor system of claim 31, wherein said plurality of optical elements comprises a collimating lens and a first cylinder lens, and wherein said collimating lens is interposed between said single light source and said first cylinder lens and said first cylinder lens is interposed between said collimating lens and said component measuring station.

42. The sensor system of claim 41, further comprising a second cylinder lens inerposed between said component in said component measuring station and said multi-element sensor array.

43. The sensor system of claim 31, wherein the sensor system is designed to align at least two components.

44. The sensor system of claim 31, wherein said single light source is pulsed.

45. The sensor system of claim 31, wherein said multi-element sensor array comprises at least two multi-element sensor arrays.

46. A system for detecting a component, the component presenting a first component axis and a second component axis, said first and second component axes oriented generally transverse to each other to present a component viewing plane, said component presenting a component width along said first axis and a component height along said second axis, said system comprising:

a generally point light source for providing light;

a detector oriented relative to said light source to present a path of travel between said light source and said detector;

a component carrier for selectively positioning the component in a component measuring station within said light path between the light source and the detector; and a lens for receiving the light passing said component and for projecting said component viewing plane onto said detector as a focused image along said second axis and as a shadow along said first axis when said component is positioned in said component measuring station.

47. The system of claim 46, further comprising a collimating lens located between said light source and said component, for collimating the source light.

48. The system of claim 47, further comprising a lens for focusing the collimated source light into a stripe of light at said component measuring station, said stripe of light striking said component width when said component is positioned in said component measuring station.

49. The system of claim 46, wherein said component has opposed first and second sides, said component measuring station being interposed between said light source and said detector such that said component first side is facing said light source and said second side is facing said detector when said component is in said component measuring station.

50. A system for detecting a component, the component presenting a first component axis and a second component axis, said first and second component axes oriented generally transverse to each other to present a component viewing plane, said component presenting a component width along said first axis and a component height along said second axis, said system comprising:

a light source for providing non-collimated light along a light path of travel;

a detector positioned within said light path of travel;

a component carrier for selectively positioning the component in a component measuring station within said light path of travel between the light source and the detector; and lens means, positioned within said light path between said component and said detector, for projecting an image of said component onto said detector along one of said first and second axes when said component is in said component measuring station, and for projecting a shadow of said component onto said detector along the other of said first and second axes when said component is in said component measuring station.

51. The system of claim 50, further comprising a condenser lens located within said light path between said light source and said component, for directing a stripe of light across said width of said component and past the edges of said component.

52. The system of claim 50, further comprising folding means placed between said lens means and said detector for folding the image from said detector and for directing the folded image onto said detector.

53. The system of claim 50, wherein said detector component has opposed first and second sides, said component measuring station being interposed between said light source and said detector such that said component first side is facing said light source and said second side is facing said detector when said component is in said component measuring station.

* * * * *